United States Patent
Houston

(10) Patent No.: US 10,216,942 B1
(45) Date of Patent: Feb. 26, 2019

(54) METHOD FOR PRESERVING THE INTEGRITY OF STORED DATA

(71) Applicant: University of Louisiana at Lafayette, Lafayette, LA (US)

(72) Inventor: Louis M. Houston, Youngsville, LA (US)

(73) Assignee: University of Louisiana at Lafayette, Lafayette, LA (US)

(*) Notice: Subject to any disclaimer, the term of this patent is extended or adjusted under 35 U.S.C. 154(b) by 69 days.

(21) Appl. No.: 15/159,004

(22) Filed: May 19, 2016

Related U.S. Application Data

(60) Provisional application No. 62/164,914, filed on May 21, 2015.

(51) Int. Cl.
| | | |
|---|---|---|
| *H04L 9/00* | (2006.01) | |
| *G06F 21/60* | (2013.01) | |
| *G06F 21/64* | (2013.01) | |
| *H04L 9/06* | (2006.01) | |

(52) U.S. Cl.
CPC ............ *G06F 21/602* (2013.01); *G06F 21/64* (2013.01); *H04L 9/06* (2013.01)

(58) Field of Classification Search
CPC . H04L 9/00; H04L 63/00; H04L 9/06; H04W 12/00; G06F 21/00; G06F 21/602; G06F 21/64
See application file for complete search history.

(56) References Cited

U.S. PATENT DOCUMENTS

| | | | | |
|---|---|---|---|---|
| 7,412,475 | B1 * | 8/2008 | Govindarajalu | .... G06F 11/0763 708/530 |
| 2010/0332942 | A1 * | 12/2010 | Wezelenburg | ...... G06F 11/1048 714/763 |
| 2013/0314751 | A1 * | 11/2013 | Weaver | .............. G06K 15/1827 358/3.28 |
| 2015/0244504 | A1 * | 8/2015 | Camuffo | ............... H04L 1/0003 375/285 |

* cited by examiner

*Primary Examiner* — Brandon S Hoffman
*Assistant Examiner* — Helai Salehi
(74) *Attorney, Agent, or Firm* — Russel O. Primeaux; Jessica C. Engler; Kean Miller LLP

(57) ABSTRACT

When data is stored for a significant amount of time or is transmitted through a noisy environment, it is not uncommon for pieces of that data to be lost or degraded. The disclosed method provides users with a new way of generating and then storing data to provide for easy recovery of said data when pieces of data are lost during storage or during transmission. Unlike the present art, which requires users to store or transmit redundant data, this method does not require redundancy. By removing that redundancy, space-costs of storing data can be reduced.

3 Claims, 3 Drawing Sheets

METHOD FOR PRESERVING THE INTEGRITY OF STORED DATA

This application claims the benefit of U.S. Provisional Patent Application No. 62/164,914 filed on May 21, 2015. The disclosures of the referenced application are hereby incorporated herein in its entirety by reference.

The present invention generally relates to the field of media preservation and data recovery. More particularly, the present invention relates to generating and recovering data that has deteriorated in storage or during data transmission.

Media preservation refers to the method by which data is recorded, stored, and preserved over time. Media is stored on a variety of devices, which are capable of storing data on a short-term basis. However, long-term data storage can be more problematic since many methods of data storage were not intended to last. This can be problematic because the stored or archived data, while not necessarily used on a daily basis, may still need to be reliably accessed. Data reliability and degradation is also an issue when that data is transmitted through noisy environments.

The standard method for enabling data recovery is to store or transmit redundant data. Data redundancy is created when the same piece of data is held in two separate places. The additional copy of the data can be a complete copy of the entire piece of data, or only select pieces that allow detection of errors and reconstruction of any lost or damaged data up to a certain level. The method disclosed herein does not rely on or require redundancy to recover data. However, the disclosed method is enhanced by redundancy to achieve data recovery that is beyond the current potential in the present art.

SUMMARY OF THE INVENTION

The disclosed invention provides users with a new way of generating and then storing data to provide for easy recovery of said data when pieces of data are lost during storage or during transmission. The disclosed invention proves a novel method for restoring and preserving the stored data without having to store or transmit redundant data. In this method, data is first generated by creating data that has a digital root of 9, and then when the data is to be restored, the data in storage is inputted, with zeroes inputted for the missing digit. The missing digit is then found using the disclosed method and inputted into the zero placeholder's place.

DETAILED DESCRIPTION OF THE INVENTION

The invention disclosed herein describes a novel method for restoring and preserving the integrity of data without having to store or transmit redundant data. The described features, structures, or characteristics may be combined in any suitable manner in one or more embodiments. One skilled in the relevant art will recognize that the method may be practiced without one or more of the specific details, or with other methods, components, materials, and so forth. In other instances, well-known structures, materials, or operations are not shown or described in detail to avoid obscuring aspects of the invention. The disclosed method is performed as follows.

The digital root 9 method for data recover involves a two-step process of first generating the data and then a later step of restoring said data. First, the method for generating data using the disclosed method can be described in the following steps. First, generate N digital root 9 numbers for $i=1$ to N. Then randomly generate $$x = \frac{9m}{2^n}$$

and convert a permutation of x into an integer $z(i)$. After determining the length of $a(i)$ of $z(i)$, replace all 9s with 0s. Next, determine all possible permutations-combinations of all digital root 9 subsets of the set of N numbers, 1 to N. Then, use the addresses of the combinations to find a digital root 9 combination with a specific number of digits Q. Last, print the combination $z(n(d))$. Second, to restore the data, the data in storage is inputted, with zero inputted for the missing digit. Then, using the process detailed below, the missing digit in inputted in the zero placeholder's place. The missing digit is consequently restored and the corrected data is printed.

The method for generating data using the disclosed method will now be described in further detail. The digital root of a number is the single digit result of successive sums of the digits. For example, the digital root of 3.14 is 8. Given a positive integer a, the formula for the digital root of a is:

$$dr(a) = a - 9\left\lfloor \frac{a-1}{9} \right\rfloor \quad (1)$$

For example, let $a=314$.

$$dr(314) = 314 - 9\left\lfloor \frac{313}{9} \right\rfloor = 314 - 9(34) = 8 \quad (2)$$

Generating Digital Root 9 Numbers.

Figure 1:
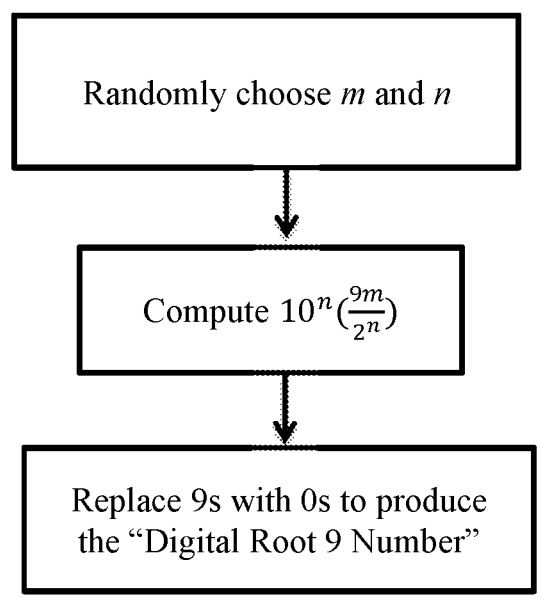
FIG. 1 depicts a flowchart representation of the method use to obtain the digital root 9 numbers used in the disclosed method.

FIG. 1 shows the process of obtaining the digital root 9 number used in this method. Given the positive integer m and the non-negative integer n, a digital root 9 number is:

$$b = 5^n(9m) \quad (3)$$

For example, $m=2533$ and $n=7$:

$$b = 5^7(9(2533)) = 1781015625 \quad (4)$$

All occurrences of the digit 9 are then replaced with the digit 0. This converts the number from a base 10 number into a base 9 number (in the example, the number is already base 9). Equation (1) is then applied to obtain the digital root:

$$dr(1781015625) = 1781015625 - 9\left\lfloor \frac{1781015624}{9} \right\rfloor \quad (5)$$

Analytic Numbers.

Figure 2:
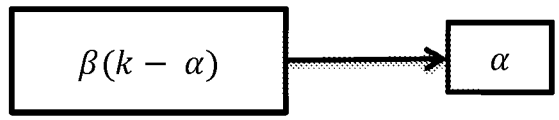
FIG. 2 depicts a flowchart for deciphering analytic numbers that is used in the disclosed method.

FIG. 2 depicts a flowchart that can assist in the deciphering of analytic numbers for this disclosed method. A simple analytic number is a number whose digits form a sequence. Given a number with k digits, the number is analytic if a digits are predictable from (k–α) digits:

$$(k-\alpha) \text{digits} \Rightarrow \alpha \text{digits} \tag{6}$$

There is a rule β for prediction of the a digits. For a sequence, α=k−1. For example, for the number 4567, k=4 and α=3. Digital root 9 numbers are analytic numbers because α=1. That is, given k−1 digits of a digital root 9 number, 1 digit can be recovered.

Data Recovery of Digital Root 9 Numbers.

With the initial steps for the method disclosed above, next are the steps that are taken when a number stored in data is discovered to be missing a digit after storage or data transmission. In this case, a digital root 9 number b is missing a digit; this number can be represented as x with the missing digit represented as j. In this case, b will equal the union of the deteriorated number x with the missing digit j, or:

$$b = x \cup j \tag{7}$$

Using this notation, j can be written as:

$$j = \Sigma_i((1-\text{sign}^2(dr(x \cup i)-9))*i) \tag{8}$$

Figure 3:
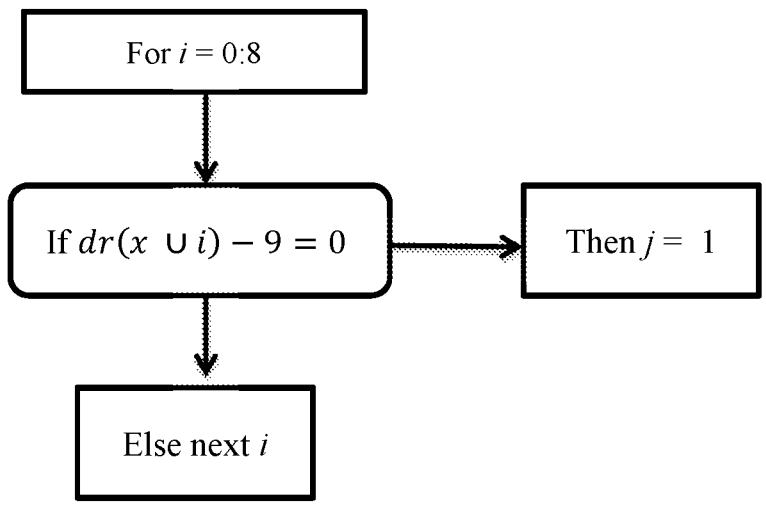
FIG. 3 depicts a flowchart for determining the missing digit in a number that is missing a digit after storage or data transmission.

A flowchart of this process can be seen in FIG. 3.

Encryption when the Digital Root 9 Formula (Equation 3 Above) is Unknown.

The digital root 9 number is a base 9 number or other number with digits belonging to the following set: {0, 1, 2, 3, 4, 5, 6, 7, 8}. Accordingly, for each digit of the non-predictable (k−1) digits in the number, there are 9 possibilities. Therefore, if P is the probability of decoding a number, then:

$$P = \frac{1}{9^{k-1}} \tag{9}$$

For example, if the number b is 1781015625 and k is 10, then:

$$P = \frac{1}{9^9} = \frac{1}{387,420,489} \tag{10}$$

Figure 4:
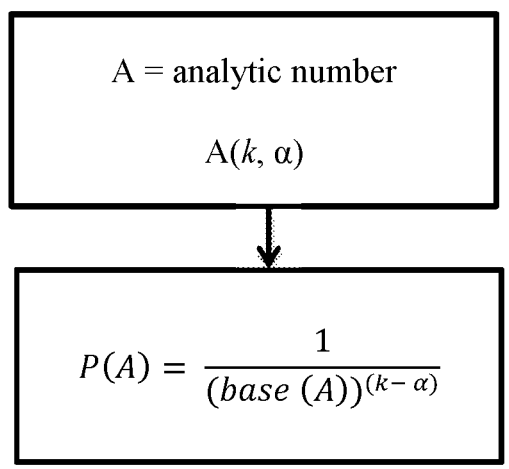
FIG. 4 depicts a flowchart for determining the probability of decoding an analytic number.

A flowchart demonstrating finding the probability of a number being decoded is shown in FIG. 4. More heavily encrypted numbers have a smaller possibility of being decoded.

Encryption when the Digital Root 9 Formula (Equation 3) is Known.

When the formula is known, integers m and n are randomly selected from a range of integers:

$$m \in [m_{min}, m_{max}] \tag{11}$$

$$n \in [n_{min}, n_{max}] \tag{12}$$

n can be small and m can be large or n can be large while m is small, and it will still be possible to generate a k-digit digital root 9 number. Once the k-digital root 9 number is generated, the permutation of the number is selected next. The k-digital root 9 number is permutated with a permutation p of the user's choosing, making b→p(b). For example, let n=15 and m=563. Using Equation (3), above, and replacing the 9s with 0s, the solution is:

b=5$^{15}$(9(563))=154632568350375 k=15

The permutation is then selected, p(b)=514632568350375. Because of this permutation, the number cannot be decoded by dividing by 9 and using trial and error to find n. Consequently, the number of possible numbers to decode is:

$$N = (n_{max} - m_{min} + 1)\frac{k!}{k_1! k_2! \ldots k_l} \tag{13}$$

where $k_j$=the redundancy of the jth digit. Using $n_{min}$=0 and $n_{max}$=15 and applying p(b)=514632568350375 and Equation 13, above, yields:

$$N = (16)\frac{15!}{2!3!4!} = (16)\frac{15!}{288} = 72,648,576,000$$

Figure 5:
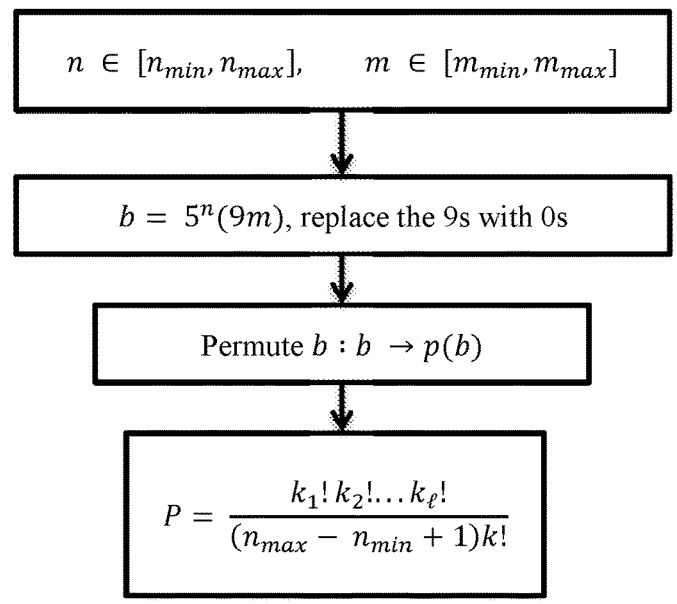
FIG. 5 depicts a flowchart of the process for deriving the probability of decoding the digital root 9 number when the generating formula is known.

Therefore, the probability of decoding the number is approximately one in seventy-two billion. A flowchart of the process for deriving the probability of decoding the digital root 9 number when the generating formula is known is depicted in FIG. 5. As this number is more heavily encrypted, it follows that the disclosed method provides an encrypted number that is less likely to be decoded than those previously known in the art.

Superluminal Communication.

A message that is instantly available at the point of transmission and the point of reception is a message that is completely predictable. In this sense, a completely predictable message can be said to have infinite speed. The maximum speed of a completely unpredictable message is the speed of light, c. An analytic message is partially predictable, so the speed (v) that an analytic message will travel is somewhere between c and ∞. The exact equation for this speed is:

$$v = \left(\frac{k}{k-a}\right)c \tag{14}$$

Applying Equation 13 to the digital root 9 number given for b=1781015625 for the example generates a speed of:

$$v = \frac{10}{9}c = 1.11c$$

Figure 6:
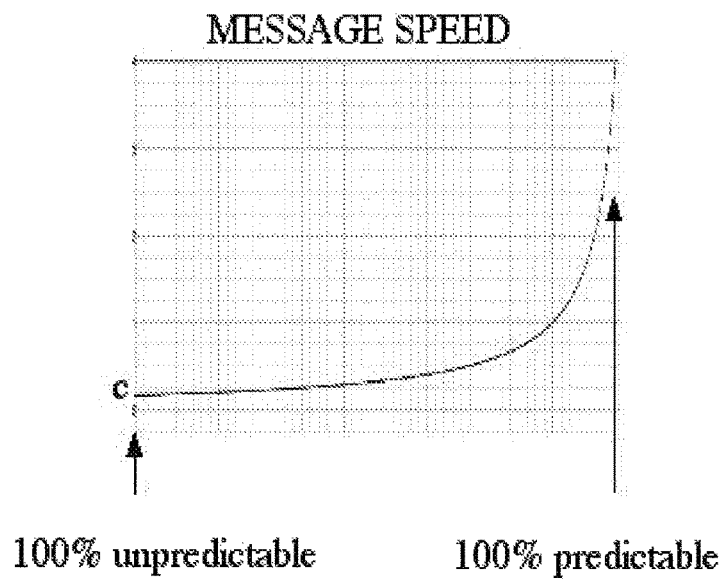
FIG. 6 shows a plot of the message speed versus predictability for stored data.

A plot of the message speed versus predictability is shown in FIG. 6.

Pattern Analysis.

The rule or pattern β of an analytic message A is what makes the message partially predictable. For example, the rule that the digital root equals 9 is what permits the recovery of the missing digit. If the user of this method were to receive an analytic message that was unaware that the message was analytic, then it is possible to decipher β by analyzing the number. The minimum amount of information in β is:

$$I_{min}(\beta) = \text{sign}(k-\alpha)\text{sign}(\alpha)\log_2 \frac{n^{k-\alpha}}{k(k-\alpha)!} \quad (15)$$

For example, for a sequence 4567, β="add 1 to get the next number", k=4, and α=3:

$$I_{min}(\beta) = \log_2 \frac{10}{4} = 1.32 \text{ bits}$$

This result is the minimum required information to decipher β. The amount of information required to decipher the analytic message A is:

$$I(A) = (k-\alpha)\log_2 n \quad (16)$$

For this example, I(A)=3.32 bits. This indicates that there is a greater chance of deciphering the pattern as opposed to deciphering the number. For the digital root 9 number given in the Example above at (4),
$I_{min}(\beta)$=6.74 bits and I(A)=28.54 bits
This method is implemented into software. It is known in the art that all numbers $$\frac{9m}{2^n}$$

or $$\frac{9m}{5^n},$$

where m and n are positive and non-negative integers have a digital root of 9. As described above, the digital root is the single digit result of successive digit sums. By selecting m and n randomly, one can generate arbitrary digital root 9 numbers. Given a set N digital root 9 numbers generated mathematically, all possible permutations of all possible subsets that have a digital root of 9 can be produced and a combination with specific length can be selected. Combinations and permutations of digital root 9 numbers retain a digital root of 9. If the length of the selected permutation-combinations is Q, then the number of possible desired permutations-combinations of digital root 9 numbers is:

$$(n_{max} - n_{min} + 1)\frac{Q!}{k_1! k_2! \ldots k_l!}$$

If Q=16, then number of possible numbers is approximately $10^{12}$ (assuming an average redundancy factorial of 216). This is a trillion possible numbers, which is extremely difficult to decrypt.

After the data is generated, the data must be recovered. For example, suppose the data D (that has been converted to base 9 by replacing all 9s with 0s) that is retrieved from storage is completely missing a digit y due to deterioration. To determine y, we would vary y from 0 to 8 until the digital root of D equals 9. Then data is precisely recovered.

In an additional example, supposed the data D retrieved from storage is missing digit y and a second digit z due to deterioration. It is known that y has nine possibilities and z has two possibilities. Using trial and error, there are eighteen possibilities. Using the digital root 9 recovery method, there would only be two possibilities.

A further example of this system is now provided. It is given that the number $$10^n \left(\frac{9m}{2^n}\right)$$

is a digital root 9 integer. In this example, a credit card number with 16 digits is to be generated. The method, which is implemented through software, generates:

$$10^5 \left(\frac{9(563)}{2^5}\right) = 15834375 \text{ and } 10^5 \left(\frac{9(933)}{2^5}\right) = 26240625$$

This becomes the new credit card number. After long storage, the credit card number is retrieved and found to be D=158y4375 26240625, where y is the missing digit. To recover y, we use the following equation to calculate the digital root of D while varying y from 0 to 8 until dr(D)=9.

$$dr(D) = D - 9\left\lfloor \frac{D-1}{9} \right\rfloor$$

In this example, y would be found to equal 3. In the above equation, $\lfloor \ \rfloor$ represents the greatest integer function.

The logic code to generate the data can be written in the following basic code which can be easily transcribed into any computer language, including but not limited to those currently known in the art.

```
1: Dim z(100), a(100), b(100), D(100)
   For i=1 to N
1.a: m=rnd(m_min, m_max)
     n=rnd(n_min, n_max)
     x=5^n (9m)
1.b: z(i)=permutation(x)
1.c: For j=100, step-1
```

$$e = \left\lfloor \frac{z(i)}{10^{j-1}} \right\rfloor - 10\left\lfloor \frac{z(i)}{10^j} \right\rfloor$$

```
     If e 0 then a(i)=100-j+1, goto 50
     next j
     50 continue
1.d: For j=1 to a(i)
```

$$D(k) = \left\lfloor \frac{z(i)}{10^{j-1}} \right\rfloor - 10\left\lfloor \frac{z(i)}{10^j} \right\rfloor$$

```
     If D(j)=9 then D(j)=0
     next j
     sum=0
     For j=1 to a(i)
     z(i)=sum+10^{i-1}D(j)
     next j
     next i
2: For i=1 to M
   sum=0
   m_1=X
   For j=1 to m_1
```

```
    b(j)=X
    sum=sum+a(b(j))
  next j
  If sum=Q then goto 100
next i
100 continue
  For i=1 to m_1
  print z(b(i));
  next i
end
```

The method for restoring the data previously generated can be written using the following logic code, which can easily be transcribed into a computer language, including those known in the art.

```
1: Dim d(100)
  input z
2: input w
3: For u=1 to Q
```

$$d(u) = \left\lfloor \frac{z}{10^{u-1}} \right\rfloor - 10 \left\lfloor \frac{z}{10^u} \right\rfloor$$

```
  next u
  For j=0 to 8
  x=0
  For k=1 to Q
  x=x+10^{k-1}d(k)
  next k
```

$$dr = x - 9 \left\lfloor \frac{x-1}{9} \right\rfloor$$

```
  If dr=9 then goto 100
  d(w)=d(w)+1
  next j
4: 1000 print x
  End
```

In an additional embodiment, redundant data is stored or transmitted (depending on the application) after the data is generated to enhance the reliability of the disclosed restoration method.

It is anticipated that the disclosed DIGITAL ROOT NINE DATA INTEGRITY SOFTWARE could be used to restore an extensive array of data including credit card numbers, passwords, check numbers, social security numbers, driver's license numbers, account numbers, or security codes. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art.

I claim:

1. A method for creating and restoring encrypted data using a computer processing unit, comprising:
   (a) generating a digital root 9 number to be stored, comprising:
      randomly choosing a positive integer m and a non-negative integer n;
      computing a resulting value for $$10^n \left( \frac{9m}{2^n} \right);$$

and
      replacing any 9s in the resulting number with 0s to produce the digital root 9 number;
   (b) encrypting the digital root 9 number, comprising:
      randomly selecting integers m and n from a range of pre-set integers;
      computing a resulting value b for $5^n(9m)$;
      counting a total number of at least one integers in value b and subtracting that total number of integers by 1 to determine an analytic k value; and
      determining at least one permutation using the b and k values;
   (c) storing the encrypted number;
   (d) discovering that at least one integer y of the encrypted number has been degraded during storage;
   (e) inputting integer values for the integer y from values of 0 through 8 until the digital root of the encrypted number equals 9.

2. The method of claim 1 wherein the encrypted number is degraded during transmission of the data through a noisy environment.

3. The method of claim 1 wherein a redundant copy of the encrypted number is also saved.

* * * * *